(12) United States Patent
Crady et al.

(10) Patent No.: US 8,370,054 B2
(45) Date of Patent: Feb. 5, 2013

(54) USER LOCATION DRIVEN IDENTIFICATION OF SERVICE VEHICLES

(75) Inventors: Mark Crady, Palo Alto, CA (US); Michael J. Chu, Los Altos Hills, CA (US); Russell Y. Shoji, Redwood City, CA (US)

(73) Assignee: Google Inc., Mountain View, CA (US)

( * ) Notice: Subject to any disclaimer, the term of this patent is extended or adjusted under 35 U.S.C. 154(b) by 1958 days.

(21) Appl. No.: 11/089,691

(22) Filed: Mar. 24, 2005

(65) Prior Publication Data
US 2006/0217885 A1 Sep. 28, 2006

(51) Int. Cl.
| G05D 1/02 | (2006.01) |
| G06F 17/10 | (2006.01) |
| G06G 7/78 | (2006.01) |
| G01C 21/00 | (2006.01) |
| G01C 21/34 | (2006.01) |
| G08G 1/123 | (2006.01) |
| G01S 1/00 | (2006.01) |
| G01S 5/02 | (2010.01) |

(52) U.S. Cl. ........ 701/300; 701/433; 701/453; 701/482; 701/516; 701/517

(58) Field of Classification Search .................... 701/213
See application file for complete search history.

(56) References Cited

U.S. PATENT DOCUMENTS

| 4,728,959 A | 3/1988 | Maloney et al. |
| 4,742,357 A | 5/1988 | Rackley |
| 4,743,913 A | 5/1988 | Takai |
| 4,791,572 A | 12/1988 | Green, III et al. |
| 4,799,062 A | 1/1989 | Sanderford, Jr. et al. |
| 4,839,656 A | 6/1989 | O'Neill et al. |
| 4,847,772 A | 7/1989 | Michalopoulos et al. |
| 4,884,208 A | 11/1989 | Marinelli et al. |
| 4,888,593 A | 12/1989 | Friedman et al. |
| 4,899,285 A | 2/1990 | Nakayama et al. |
| 4,903,212 A | 2/1990 | Yokouchi et al. |
| 4,916,455 A | 4/1990 | Bent et al. |
| 4,916,621 A | 4/1990 | Bean et al. |
| 4,924,699 A | 5/1990 | Kuroda et al. |
| 4,928,106 A | 5/1990 | Ashjaee et al. |
| 4,928,107 A | 5/1990 | Kuroda et al. |
| 4,982,332 A | 1/1991 | Saito et al. |
| 4,985,705 A | 1/1991 | Stammler |
| 4,987,420 A | 1/1991 | Inamiya |
| 5,003,317 A | 3/1991 | Gray et al. |
| 5,014,066 A | 5/1991 | Counselman, III |
| 5,023,900 A | 6/1991 | Tayloe et al. |
| 5,045,860 A | 9/1991 | Hodson |

(Continued)

OTHER PUBLICATIONS

Cassias et al., Vehicle Telematics: A Literature Review, 2007, Internet, 1-28.*

(Continued)

Primary Examiner — Khoi Tran
Assistant Examiner — Nicholas Kiswanto
(74) Attorney, Agent, or Firm — McDermott Will & Emery LLP

(57) ABSTRACT

A vehicle position aggregation system receives position information for service vehicles from various fleet management systems, and maintains the current location of the vehicles in a database, including information identifying each vehicle's associated fleet and related contact information. End users can query the vehicle position aggregation system to obtain information about service vehicles in the vicinity of the user's input location.

23 Claims, 3 Drawing Sheets

U.S. PATENT DOCUMENTS

| | | |
|---|---|---|
| 5,056,106 A | 10/1991 | Wang et al. |
| 5,095,500 A | 3/1992 | Tayloe et al. |
| 5,119,104 A | 6/1992 | Heller |
| 5,131,020 A | 7/1992 | Liebesny et al. |
| 5,146,219 A | 9/1992 | Zechnall |
| 5,163,004 A | 11/1992 | Rentz |
| 5,166,694 A | 11/1992 | Russell et al. |
| 5,182,555 A | 1/1993 | Sumner |
| 5,218,367 A | 6/1993 | Sheffer et al. |
| 5,225,809 A | 7/1993 | Bunn |
| 5,239,667 A | 8/1993 | Kanai |
| 5,243,528 A | 9/1993 | Lefebvre |
| 5,264,857 A | 11/1993 | Baghdady |
| 5,293,642 A | 3/1994 | Lo |
| 5,299,132 A | 3/1994 | Wortham |
| 5,311,195 A | 5/1994 | Mathis et al. |
| 5,315,295 A | 5/1994 | Fujii |
| 5,317,311 A | 5/1994 | Martell et al. |
| 5,317,323 A | 5/1994 | Kennedy et al. |
| 5,319,374 A | 6/1994 | Desai et al. |
| 5,402,117 A | 3/1995 | Zijderhand |
| 5,402,346 A | 3/1995 | Lion et al. |
| 5,428,546 A | 6/1995 | Shah et al. |
| 5,465,289 A | 11/1995 | Kennedy, Jr. |
| 5,465,390 A | 11/1995 | Cohen |
| 5,515,042 A | 5/1996 | Nelson |
| 5,539,645 A | 7/1996 | Mandhyan et al. |
| 5,559,864 A | 9/1996 | Kennedy, Jr. |
| 5,570,087 A | 10/1996 | Lemelson |
| 5,572,450 A | 11/1996 | Worthy |
| 5,574,648 A | 11/1996 | Pilley |
| 5,602,739 A | 2/1997 | Haagenstad et al. |
| 5,604,676 A | 2/1997 | Penzias |
| 5,668,717 A | 9/1997 | Spall |
| 5,696,503 A | 12/1997 | Nasburg |
| 5,719,584 A | 2/1998 | Otto |
| 5,724,660 A | 3/1998 | Kauser et al. |
| 5,731,978 A | 3/1998 | Tamai et al. |
| 5,732,383 A | 3/1998 | Foladare et al. |
| 5,740,535 A | 4/1998 | Rune |
| 5,745,865 A | 4/1998 | Rostoker et al. |
| 5,758,264 A | 5/1998 | Bonta et al. |
| 5,764,163 A | 6/1998 | Waldman et al. |
| 5,774,802 A | 6/1998 | Tell et al. |
| 5,805,079 A | 9/1998 | Lemelson |
| 5,812,069 A | 9/1998 | Albrecht et al. |
| 5,815,802 A | 9/1998 | Loechner, II |
| 5,828,585 A | 10/1998 | Welk et al. |
| 5,828,962 A | 10/1998 | Ho-A-Chuck |
| 5,835,008 A | 11/1998 | Colemere, Jr. |
| 5,854,975 A | 12/1998 | Fougnies et al. |
| 5,859,612 A | 1/1999 | Gilhousen |
| 5,926,113 A | 7/1999 | Jones et al. |
| 5,933,100 A | 8/1999 | Golding |
| 5,946,612 A | 8/1999 | Johansson |
| 5,948,042 A | 9/1999 | Heimann et al. |
| 5,952,941 A | 9/1999 | Mardirossian |
| 5,959,577 A * | 9/1999 | Fan et al. ................. 342/357.13 |
| 5,959,580 A | 9/1999 | Maloney et al. |
| 6,006,159 A | 12/1999 | Schmier et al. |
| 6,011,515 A | 1/2000 | Radcliffe et al. |
| 6,012,012 A | 1/2000 | Fleck et al. |
| 6,061,558 A * | 5/2000 | Kennedy et al. .............. 455/411 |
| 6,067,031 A | 5/2000 | Janky et al. |
| 6,104,316 A | 8/2000 | Behr et al. |
| 6,108,555 A | 8/2000 | Maloney et al. |
| 6,119,013 A | 9/2000 | Maloney et al. |
| 6,127,975 A | 10/2000 | Maloney |
| 6,128,571 A | 10/2000 | Ito et al. |
| 6,140,956 A | 10/2000 | Hillman et al. |
| 6,144,916 A | 11/2000 | Wood, Jr. et al. |
| 6,148,193 A | 11/2000 | Miska et al. |
| 6,150,961 A | 11/2000 | Alewine et al. |
| 6,154,657 A | 11/2000 | Grubeck et al. |
| 6,202,024 B1 | 3/2001 | Yokoyama et al. |
| 6,236,851 B1 | 5/2001 | Fougnies et al. |
| 6,236,933 B1 | 5/2001 | Lang |
| 6,246,884 B1 | 6/2001 | Karmi et al. |
| 6,246,948 B1 | 6/2001 | Thakker |
| 6,256,504 B1 | 7/2001 | Tell et al. |
| 6,268,804 B1 | 7/2001 | Janky et al. |
| 6,275,705 B1 | 8/2001 | Drane et al. |
| 6,288,675 B1 | 9/2001 | Maloney |
| 6,288,676 B1 | 9/2001 | Maloney |
| 6,308,071 B1 | 10/2001 | Kalev |
| 6,314,363 B1 * | 11/2001 | Pilley et al. ................... 701/120 |
| 6,314,365 B1 | 11/2001 | Smith |
| 6,321,092 B1 | 11/2001 | Fitch et al. |
| 6,324,392 B1 | 11/2001 | Holt |
| 6,333,703 B1 | 12/2001 | Alewine et al. |
| 6,339,745 B1 * | 1/2002 | Novik ........................... 701/208 |
| 6,341,255 B1 * | 1/2002 | Lapidot ......................... 701/209 |
| 6,348,889 B1 | 2/2002 | Ashihara et al. |
| 6,356,758 B1 | 3/2002 | Almeida et al. |
| 6,356,823 B1 | 3/2002 | Iannotti et al. |
| 6,356,841 B1 | 3/2002 | Hamrick et al. |
| 6,366,241 B2 | 4/2002 | Pack et al. |
| 6,381,533 B1 | 4/2002 | Crane et al. |
| 6,385,533 B1 | 5/2002 | Halt et al. |
| 6,385,539 B1 | 5/2002 | Wilson et al. |
| 6,397,067 B1 | 5/2002 | Tanaka et al. |
| 6,411,889 B1 | 6/2002 | Mizunuma et al. |
| 6,424,837 B1 | 7/2002 | Hall et al. |
| 6,427,117 B1 | 7/2002 | Ito et al. |
| 6,438,380 B1 | 8/2002 | Bi et al. |
| 6,472,978 B1 | 10/2002 | Takagi et al. |
| 6,473,000 B1 | 10/2002 | Secreet et al. |
| 6,477,379 B2 | 11/2002 | Kingdon |
| 6,484,015 B1 | 11/2002 | Aleiner et al. |
| 6,502,020 B2 | 12/2002 | Lang |
| 6,505,114 B2 | 1/2003 | Luciani |
| 6,512,465 B2 | 1/2003 | Flick |
| 6,522,296 B2 | 2/2003 | Holt |
| 6,522,890 B2 * | 2/2003 | Drane et al. ................. 455/456.5 |
| 6,529,165 B1 | 3/2003 | Duffett-Smith et al. |
| 6,539,300 B2 | 3/2003 | Myr |
| 6,546,256 B1 * | 4/2003 | Maloney et al. ........... 455/404.2 |
| 6,560,532 B2 | 5/2003 | Cayford |
| 6,574,484 B1 | 6/2003 | Carley |
| 6,577,946 B2 * | 6/2003 | Myr ............................. 701/117 |
| 6,580,367 B2 | 6/2003 | Roach |
| 6,580,393 B2 | 6/2003 | Holt |
| 6,608,593 B2 | 8/2003 | Holt |
| 6,611,750 B2 | 8/2003 | MacPhail et al. |
| 6,622,085 B1 | 9/2003 | Amita et al. |
| 6,650,948 B1 | 11/2003 | Atkinson et al. |
| 6,690,294 B1 | 2/2004 | Zierden |
| 6,697,012 B2 | 2/2004 | Lodwig et al. |
| 6,704,563 B1 | 3/2004 | Senn et al. |
| 6,756,913 B1 * | 6/2004 | Ayed ......................... 340/825.49 |
| 6,757,545 B2 | 6/2004 | Nowak et al. |
| 6,757,609 B2 | 6/2004 | Tsuge et al. |
| 6,792,348 B2 | 9/2004 | Hameleers et al. |
| 6,795,019 B2 | 9/2004 | Holt |
| 6,810,321 B1 * | 10/2004 | Cook ........................... 701/117 |
| 6,813,501 B2 | 11/2004 | Kinnunen et al. |
| 6,819,268 B2 | 11/2004 | Wakamatsu et al. |
| 6,990,409 B2 * | 1/2006 | Khan et al. .................... 701/204 |
| 7,113,864 B2 * | 9/2006 | Smith et al. ................... 701/117 |
| 7,468,661 B2 * | 12/2008 | Petite et al. ................... 340/540 |
| 7,509,116 B2 * | 3/2009 | Fan et al. ...................... 455/405 |
| 2001/0014847 A1 | 8/2001 | Keenan |
| 2002/0014978 A1 | 2/2002 | Flick |
| 2002/0057212 A1 * | 5/2002 | Hamilton et al. ............. 340/988 |
| 2002/0065599 A1 | 5/2002 | Hameleers et al. |
| 2002/0095249 A1 | 7/2002 | Lang |
| 2002/0194016 A1 | 12/2002 | Moribe et al. |
| 2003/0016143 A1 | 1/2003 | Ghazarian |
| 2003/0060967 A1 | 3/2003 | MacPhail et al. |
| 2003/0071730 A1 | 4/2003 | Valbh |
| 2003/0073406 A1 | 4/2003 | Benjamin et al. |
| 2003/0076417 A1 | 4/2003 | Thomas et al. |
| 2003/0083804 A1 | 5/2003 | Pilley et al. |
| 2003/0182052 A1 * | 9/2003 | DeLorme et al. ............. 701/201 |
| 2003/0235282 A1 | 12/2003 | Sichelman et al. |
| 2004/0010366 A1 | 1/2004 | Videtich |
| 2004/0036601 A1 | 2/2004 | Obradovich |

| | | |
|---|---|---|
| 2004/0044471 A1 | 3/2004 | Tsuge et al. |
| 2004/0073356 A1 | 4/2004 | Craine |
| 2004/0102893 A1 | 5/2004 | Atkinson et al. |
| 2004/0119612 A1 | 6/2004 | Chen |
| 2004/0222904 A1 | 11/2004 | Ciolli |
| 2005/0080606 A1* | 4/2005 | Ampunan et al. .............. 703/8 |
| 2007/0052586 A1* | 3/2007 | Horstemeyer .............. 342/457 |
| 2008/0186164 A1* | 8/2008 | Emigh et al. ............ 340/539.13 |

OTHER PUBLICATIONS

Murphy, How to Choose a GPS Fleet Management System_ What Features Are Right for You, 2004, Internet, p. 1-2.*

IMAGINS—AVL_FM 1998, Internet, p. 1-3.*

Burgener, E.C., "A Personal Transit Arrival Time Receiver," Proceedings of the IEEE Vehicle Navigation & Information Systems Conference, 1993, pp. 54-55.

Casey, R., et al., "Advanced Public Transportation Systems: The State of the Art Update'96," Jan. 1996, 162 pages.

Kihl, M., Advanced Vehicle Location System for Paratransit in Iowa, Proceedings of the IEEE Vehicle Navigation & Information Systems Conference, 1993, pp. 381-384.

McLellen, J., et al., "The NavTrax™ Fleet Management System," IEEE Position Location and Navigation Symposium, 1992, pp. 509-515.

* cited by examiner

USER LOCATION DRIVEN IDENTIFICATION OF SERVICE VEHICLES

CROSS REFERENCE TO RELATED APPLICATION

This application is related to U.S. application Ser. No. 11/021,758, entitled INTEGRATION OF MULTIPLE SOURCES OF REAL TIME TRAFFIC INFORMATION INTO A UNIFIED DATABASE (herein "REAL TIME TRAFFIC INFORMATION" application), filed on Dec. 23, 2004, which is incorporated by reference herein.

FIELD OF INVENTION

The present invention relates in general to tracking and management of service vehicles and, in particular, to the formation of databases of location information of service vehicles and the automated provisioning of this information to remote end users.

BACKGROUND OF INVENTION

Fleet tracking systems for service vehicle fleets have been under development for many years in various forms. Many different types of services use fleet tracking systems, including vehicle for hire services that transport persons, such as taxi, limousine, bus, and shuttle companies, delivery companies that transport goods such as local and long haul delivery companies, and business service companies (plumbers, utilities, exterminators, etc.). Fleet tracking serves a variety of functions including but not limited to basic vehicle tracking, geo-fencing, time card tracking and speed limit compliance. In order to be used for this system, the fleet tracking service must perform the basic function of locating the position of vehicles in the fleet. This can be done through a variety of technologies but is most often achieved through the use of GPS tracking devices installed in the vehicles. The geographic position and sometimes additional information (e.g., speed, heading) is relayed from the vehicles to a central location using some form of wireless communications channel.

One limitation of existing fleet tracking systems is that are intended to track the vehicles only in one or more specifically designated fleets, such as the taxis of a particular taxi company (or group of companies) or the trucks of a particular utility company, and thereby do not track the vehicles in other fleets. A second limitation is that the location information is only provided to an internal employee of the fleet company or dispatch agency, and is not exposed to end users, such as persons needing a vehicle for hire for a pick up, or a person needing to know the location of a nearby delivery vehicle. In particular, end users cannot query a private company's fleet tracking system to obtain information about nearby service vehicles.

Another aspect of fleet tracking and management is vehicle dispatching. Vehicle dispatching of service vehicles is performed a variety of ways. In some cases, specific routes are determined prior to a vehicle leaving the dispatch center. In others, the vehicle is routed in an "on demand" fashion. Hybrid systems can have aspects of both types of approaches. "For hire" vehicles use all of these dispatch methods. For example, a limousine in a limousine service may be given a known set of customers for pickup and set of routes at the start of a day. By contrast, a taxi is typically dispatched on demand as end users call in to the dispatch agent. A shuttle may have a predetermined set of routes, followed by a period of on demand scheduling. The same variety of dispatch methods exists for delivery vehicles (e.g., package pick up or drop off) and other business service vehicles (e.g., utility service, electrical service, plumbing service, towing service).

Today, most end users searching for these service providers will select based on word of mouth reference, directories, known providers. For vehicle for hire, an end user may just raise a hand and hail the nearest cab. Users are most likely unaware of which provider has the most vehicles, the closest vehicle or the highest density of vehicles in any given area. In addition, users may want regular updates on the proximity of the vehicle to themselves or another point of interest such as how long it will take for the shuttle to arrive or how far away the cable repair man is.

Thus, it would be desirable to provide a system that could collect the information from a variety of fleet management systems and provide position information directly to end users to help them make decisions and/or keep them informed.

SUMMARY OF THE INVENTION

A vehicle position aggregation system integrates multiple sources of real time or near real time vehicle position data for service vehicles into a unified database. The vehicle position database includes information to identify the service vehicles, their position and can include the time of a given service vehicle's position. The vehicle position aggregation system aggregates information from a plurality of different service companies, including companies that offer competitive services, such as multiple taxis companies, delivery companies, business service companies and so forth.

The present invention includes various functional capabilities provided by the vehicle position aggregation system. One function of the vehicle position aggregation system is to provide vehicle position and related information to end users in response to queries from such users. In one embodiment, a user can input a location to the vehicle position aggregation system, and obtain the locations of nearby vehicles for hire, such as taxis. The user provides the desired location (either manually or automatically), and the vehicle position aggregation system determines which of the vehicles for hire are nearby that location, and available for usage. The user can limit the search query with respect to various attributes of the vehicles for hire, such as company, type, fare, and so forth. Related information for the vehicle for hire service such as telephone number, is likewise provided. The vehicle location information and related information is displayed to the user on the user's particular device, whether that is a personal computer, cellular telephone, palm top computer, or otherwise. The preferred display representation includes a map display of the area surrounding the user's input location, and icons representing the locations of the nearby vehicles for hire.

The vehicle position database stores vehicle information such as fleet identification, vehicle identification and vehicle status. Vehicle status may include availability, job status and/or time to availability. Vehicle position information is preferably stored as latitude and longitude but other forms of position information may be used as well.

The present invention is next described with respect to various figures and diagrams and technical information. The figures depict various embodiments of the present invention for purposes of illustration only. One skilled in the art will readily recognize from the following discussion that alternative embodiments of the illustrated and described structures, methods, and functions may be employed without departing from the principles of the invention.

DETAILED DESCRIPTION

Figure 1:
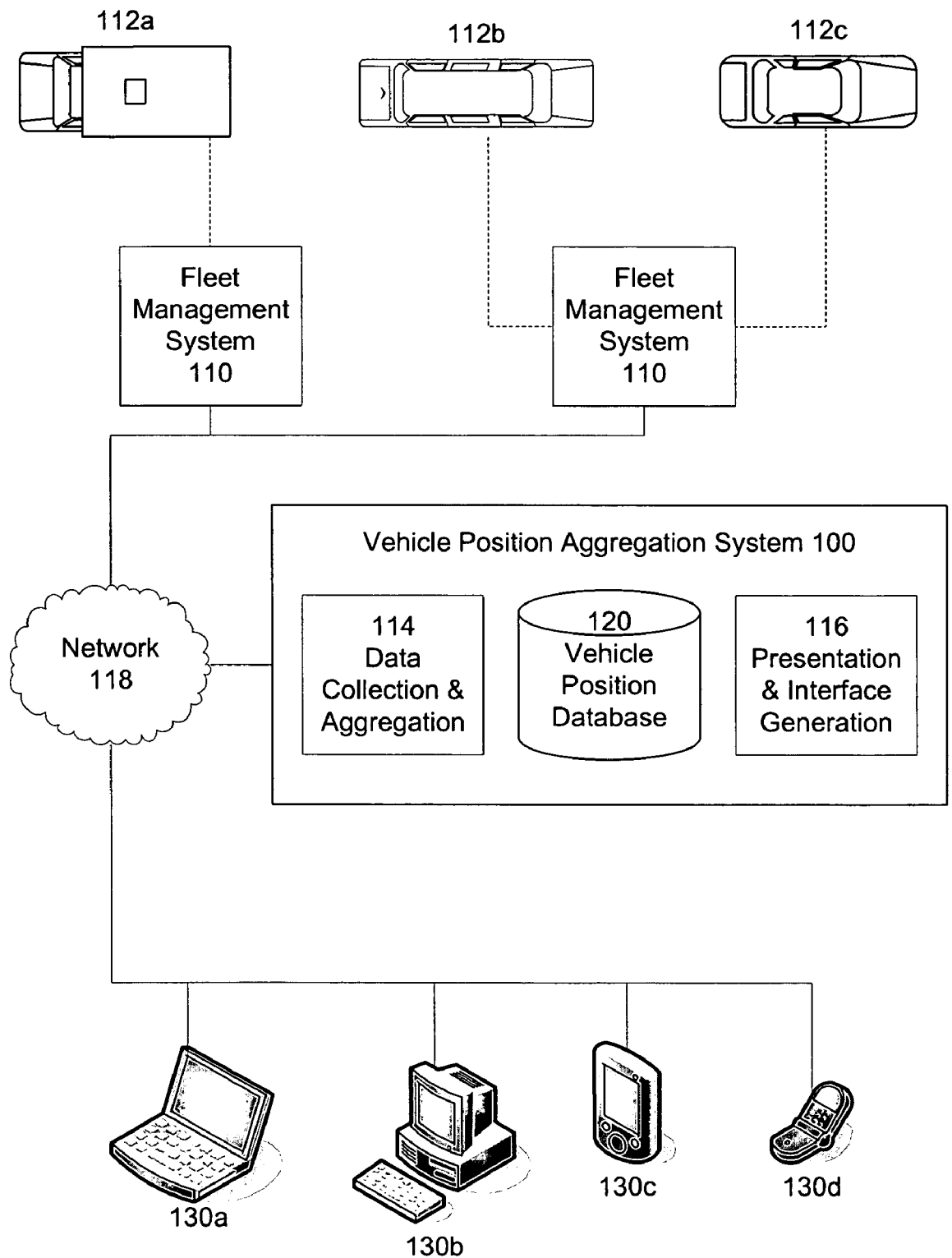
FIG. 1 is an overall system diagram of an embodiment of the vehicle position aggregation system.

Referring now to FIG. 1 there is shown system diagram illustrating an overall system environment for a vehicle position aggregation system. The vehicle position aggregation system 100 operates in conjunction with fleet management systems 110. The fleet management systems 110 will typically include systems from numerous different service companies, and thereby be independent of each other, particularly where there service companies are competitors. Likewise, the fleets can be of different types of service companies, such as towing fleets, taxi fleets, and delivery fleets. The fleets can operate in the same, overlapping or different geographic areas. In some instances a fleet management system 110 may be operated by a dispatch agency and contain information for the vehicles of one or more service companies. In this way the vehicle position aggregation system 100 operates to aggregate the information from a number of disparate and unrelated sources, thereby providing end users with a much larger and richer source of information than would otherwise be available to the end user by directly contacting any one of the underlying businesses operating the service vehicle fleet.

A fleet management system 110 receives real time or otherwise current location information from a number of service vehicles 112 in one or more fleets of vehicles, for example a fleet of vehicles for hire (e.g., taxis 112c, limousines 112b, and the like), a fleet of delivery vehicles 112a, or a fleet of business service vehicles. The location information is typically in the form of GPS data, as acquired by analog or digital location units installed in the fleet vehicles 112. The underlying location technology includes a GPS receiver, and an analog or digital backchannel (for example, private mobile radio, cellular, WiMAX, 802.11p, etc.) for communicating the GPS location information back to the fleet management system 110. The location information is usually augmented by information identifying the vehicle (e.g., a vehicle and/or fleet ID), the data source (e.g., a source ID identifying the fleet management system 110), and vehicle status (e.g., availability, job status, time to next availability, time to next delivery, etc.). Each fleet management system 110 can report the vehicle data for one or more vehicles at a time.

The vehicle information can then be passed to the vehicle position aggregation system 100 over a network connection in real time or stored by the fleet management system 110. If the vehicle information is stored by a fleet management system, the fleet management system 110 can either regularly transmit the vehicle information to the vehicle position aggregation system 100 or the vehicle position aggregation system 100 can regularly pull the vehicle information from the fleet management systems 110. The transfer of data from their sources can be through a variety of methods (e.g., socket connections, FTP, SOAP requests, and the like). The vehicle position aggregation system 100 exposes an appropriate interface to the fleet management systems 110 to provide these data transfers.

The vehicle position aggregation system 100 combines the data received from the fleet management sources in an integrated vehicle position and a fleet attribute database 120.

The vehicle position database 120 represents vehicles with the following attributes and data:

source id—a unique identifier for each source of vehicle information, typically identifying a fleet management system 110.

fleet id—an identifier that differentiates fleets within a particular fleet management system 110. A single fleet management system may have multiple fleets.

vehicle id—an identifier for a particular vehicle within a fleet. This may be different from the identifier that the fleet uses to identify the vehicle or it could be the same identifier.

vehicle position lat/long—latitude and longitude of a vehicle time—time stamp of the position recorded for the vehicle.

A separate portion of the database 120 (or a separate database) is preferably used to associate the fleet id with fleet attributes. This fleet attribute database may include the following data and attributes:

source id—a unique identifier for each source of vehicle information, typically identifying a fleet management system 110.

fleet id—the identifier that differentiates fleets within a particular fleet management system 110.

fleet name—name of the fleet.

fleet contact information—information that a user might use to contact the service business operating the fleet vehicles, such as a phone number or other additional information that the system could display associated with a particular fleet.

fleet URL—an optional field for linking to a fleet operator's web site.

The database collection and aggregation subsystem 114 receives the vehicle position information from the fleet management systems 110, parses the information, validates it, and formats for entry into the vehicle position database 120, and performs the appropriate database calls to update the database. The vehicle position aggregation system 100 may be based on the traffic information system described in the Real Time Traffic Information application, incorporated by reference herein.

The vehicle position aggregation system receives requests from end users via the presentation and interface generation subsystem 116. These end user consumers deliver a request from an end user electronic device 130, such as a notebook computer 130a, a desktop computer 130b, a handheld computer 130c, a cell phone 130d. This request includes some information about the location around which the user would like to display vehicle positions. The end user's location information can be input directly by the user in the form of address, city, zip or latitude/longitude or may be obtained from the user's device directly in the case of a device 130 that has the capability to detect and transmit position information, such as a cell phone 130d with built-in GPS capability. The end user's request is sent to the vehicle position aggregation system through a communication means such as the wired or wireless Internet and/or cellular communications.

The vehicle position aggregation system 100 receives a user's request via the presentation and interface generation subsystem 116, queries the database 120 to determine a set of vehicles that satisfy certain parameters of the request, and transmits data describing the result set to the user's device, preferably for display thereon. More specifically, the query can be processed to locate all (or a limited number) of vehicles nearby the user's position. There are a variety of methods for limiting the vehicles delivered to an end user device. The vehicle position aggregation system could limit vehicle positions retrieved to those that would appear in the viewing area of the map chosen by the user or the vehicle position aggregation system (e.g., show all vehicles that appear on the map). Another method would be give fleets a geographic region and only display vehicles from fleets where the user request and the fleet geographic region overlap. For example, a user searching for vehicles in the Chicago area would not see vehicles from a Milwaukee fleet even if they happen to be in the Chicago area. In addition, the end user device may retrieve more positions than can be currently displayed caching those positions in the end user device for display if the user alters the display area. The result set can be further constrained or filtered to include only vehicles of particular companies (e.g., only "Yellow Cab") or of certain types (e.g., limousines), certain business types (e.g., tow trucks, plumbers), or other characteristics (e.g., vehicles for hire serving the local airport), or any combination of these or other constraints. The type of service vehicle can have a default type (e.g., taxis) if it is not specified by the user. The result set includes each vehicle's location (in sufficient granularity to allow the user's device to determine and graphically display the vehicle on a map), and optionally secondary data, such the name of the company, type of vehicle, fare rate, contact information (e.g., telephone number, or a URL) and other information useful to the user in choosing a vehicle for hire. The presentation and interface generation subsystem 116 formats the result set based on the source of the request, the network connection type, or the device type, or any combination thereof. For example, where the request comes from a web browser on a notebook or desktop, the result set is formatted for presentation in standard browser window (see, e.g., FIG. 2). Where the request comes from a cellular phone or from a handheld computer, the result set can be formatted for display on the smaller screens of these types of devices (see, e.g., FIG. 3). The result set also preferably includes one or more bit maps images of a map in the vicinity of the end user's requested location.

Figure 2:
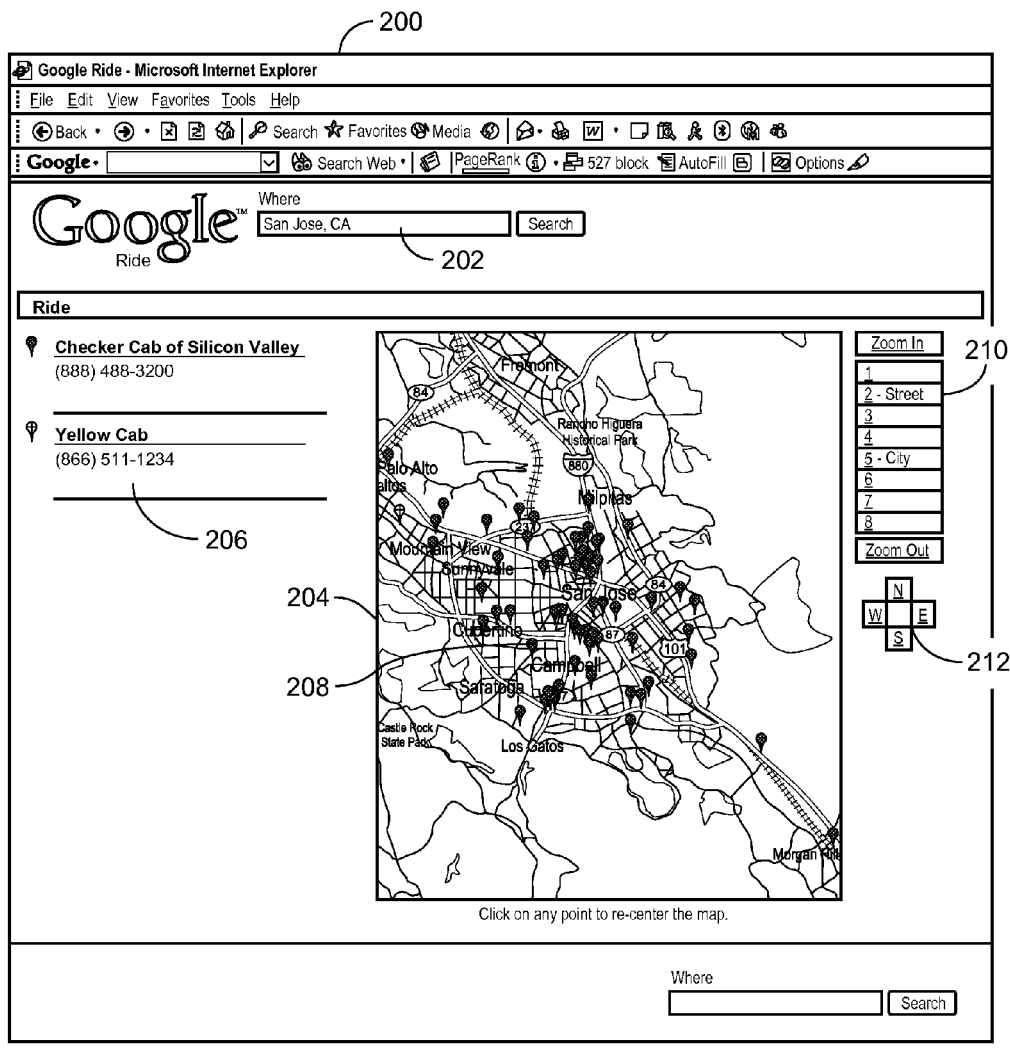
FIG. 2 is an illustration of a vehicle position display provided by the system for display on a computer screen.

The user's device 130 graphically displays to the user the positions of vehicles 120 near the location given in the user's request. FIG. 2 illustrates a sample display screen 200 in response to a user's request. Here, the request is entered into a query field 202. The result set is transmitted back to the user's device 130 for display; the display includes a map 204 and list of a company names 206, listing the companies to which the service vehicles (here taxis) belong, along with the contact information the end user can use to contact the vehicle or vehicle dispatcher. This information may include a phone number as listed, a web link (here a URL indicated the underlined name of the company) or some other data or voice connection between the end user and the vehicle dispatcher or the vehicle directly. The vehicle positions are indicated by icons 208. The vehicle positions displayed will be the most current information available to the vehicle position aggregation system 100. Using the timestamp information, if available, the vehicle position information displayed can be modified (e.g., only displaying positions that are less than 30 minutes old or showing positions that are older than 30 minutes in a different color or transparency level).

Figure 3:
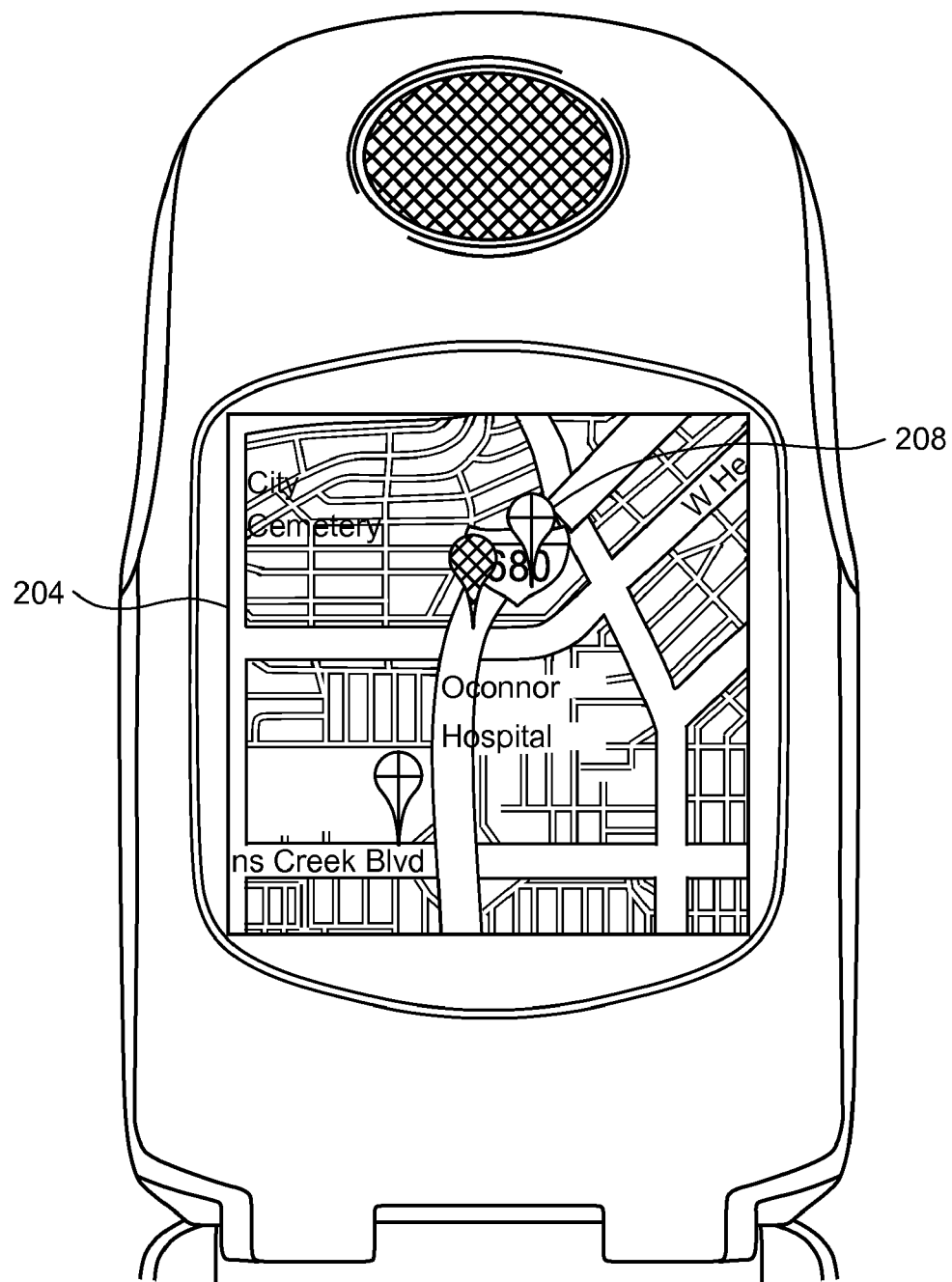
FIG. 3 is an illustration of a vehicle position display provided by the system for display on a cellular telephone.

The vehicle position aggregation system 100 can vary the span of the map displayed based on the granularity of the location information given by the user, number of vehicles currently in the database, number of fleets currently in the database 120 and/or the device that has issued the request. For example, if a user provides low granularity information by specifying only a city (e.g., San Jose, Calif.) for a location, then the vehicle position aggregation system 100 retrieves information for service vehicles a in a corresponding area, along with a corresponding map such as illustrated in FIG. 2. Likewise, if the user specifies high granularity location information, such as a specific address (e.g., 801 N. First St., San Jose, Calif.), then the vehicle position aggregation system 100 selects service vehicles in a more limited vicinity of the location, along with a corresponding more detailed map, for example the displayed maps may be of only several square blocks around the address. The vehicle position aggregation system 100 could transmit a map spanning a greater area if the number of vehicles or fleets in the user specified location is relatively sparse. For example, the vehicle position aggregation system may be set up to ensure that the initial map displayed to the user always had one, two, or some other number of vehicles displayed. Additionally, the vehicle position aggregation system 100 could adapt the span of the map 204 to better match the capabilities of the end user device 130, for example, displaying a map 204 with fewer pixels, fewer colors, with more sophisticated overlaying techniques and/or with enhanced compression for devices 130 with smaller screens or less computing power, as illustrated in FIG. 3. In one embodiment, the vehicle aggregation system 100 receives information in the request from the user that identifies at least some of the capabilities of the end user device 130. For example, many mobile device browsers transmit information about the device when sending request such as their screen size, model number, browser compatibility, and the like. The vehicle aggregation system 100 can then format the result set displayed to be compatible with the device 130. For example, the vehicle aggregation system 100 may limit the map displayed to the width of the device (e.g., 120, 130, 160, 320 pixels) and color depth (e.g, 16 colors or monochrome). In addition, the vehicle position aggregation system 100 allows the user to interactively vary the span of the map (i.e., zoom) via the zoom controls 210, and allows the user to pan the area displayed on the map via the directional pan controls 212.

Contact information for the dispatchers or vehicles may be arranged in a variety of fashions. The information may be displayed directly on the screen, either continuously or only upon some predefined user action such as mouse-over or clicking on the icon 208 for a vehicle. The information may be arranged in a tabular format next to a map 204 as well as illustrated in FIG. 2, or in other layouts. The ordering of the different fleets can be done based on a variety of metrics as well—total size of fleet, number of vehicles of each fleet displayed in the current window, most highly ranked in terms of some external measure such as best quality and business arrangement (i.e., pay for placement). The ordering of the display of the fleets is performed by the vehicle position aggregation system 100, but different ordering criteria could be used for different users, and executed by a local client application on the user's device 130, or by vehicle position aggregation system 100 based on stored account information for the user. The factors that could be used to cause different fleet display ordering could include preferences set by a user, device type, geographic location and/or time of day.

In another embodiment, the user is able to directly connect from the displayed result screen to a service business's computer servers and make a request for a pickup, delivery, or like. For example, the user can click on the vehicle icon 208 or company name 206 to be linked to the company website to book a vehicle; an interface to the company's reservation system would appear on the user's device 130 in this case. Alternatively, the when the user clicks on the vehicle icon 208 or company name 208 or company phone number, the user's device 130 sends a message (e.g., SMS, or via an email protocol) to the company's computer system to book a vehicle. Another approach, particularly useful for user's of cell phones 130d, enables the user to click on the vehicle icon 208, company name 208 or phone number and initiate a call to the company. A fourth approach transmits the user's telephone number to the service company, again via SMS, email or other messaging protocol, in which case the company calls the end user back to confirm the request. Each of the foregoing can be adapted to directly contact the driver of one of the service vehicles (or get a return call from a driver), instead of the company's dispatch operations. In addition, in any of the foregoing embodiments, the user's location-either as text (e.g., "San Jose") or as GPS data—is transmitted to the company/driver in the provided message or communication link. In this way the service company can most efficiently schedule the vehicle to the user's location, even before it contacts the user to confirm the request. In another embodiment, where a vehicle is already scheduled to proceed to a user's location, then clicking on the vehicle icon 208 generates a message to the service company's computer system that queries for the scheduled or estimated time until the vehicle arrives; the resulting time information is then transmitted to and displayed on the user's device. In addition, an alert message can be queued in the service company's computer system to be transmitted to the end user a fixed number of minutes (e.g., five minutes) before the vehicle arrives; the message can be sent by email, SMS, or as a telephone call, using a computer generated voice message.

The vehicle position aggregation system 100 provides end users with a number of functional capabilities in addition to locating nearby vehicles for hire, such as nearby taxis and limousines. For delivery companies which deliver goods to end users, the end user may query the system to see the location of a delivery truck having an item scheduled for delivery to the user's location. In this functionality, the user's request would include a unique tracking ID that can be used to identify the user's shipment in the delivery company's database. The vehicle position aggregation system 100 can use this information to query the delivery company's own database, and then format the results for presentation to the end user. Similarly, for business service vehicles, such as plumbers, exterminators, utilities, or any other service which dispatches employees to a user's location to perform a business service, the end user may user the vehicle position aggregation system 100 to determine the location of a previously assigned service employee en route to the user's location, and thereby better determine the employee's likely time of arrival. This capability eliminates the need for the end user to call the service business operations and inquire as to the employee's likely arrival time.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead be performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description the described actions and processes are those of a computer system, or similar electronic computing device, that manipulates and transforms data represented as physical (electronic) quantities within the computer system memories or registers or other such information storage, transmission or display devices. A detailed description of the underlying hardware of such computer systems is not provided herein as this information is commonly known to those of skill in the art of computer engineering.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

Certain aspects of the present invention have been described with respect to individual or singular examples; however it is understood that the operation of the present invention is not limited in this regard. Accordingly, all references to a singular element or component should be interpreted to refer to plural such components as well. Likewise, references to "a", "an", or "the" should be interpreted to include reference to pluralities, unless expressed stated otherwise. Finally, use of the term "plurality" is meant to refer to two or more entities, items of data, or the like, as appropriate for the portion of the invention under discussion, and does cover an infinite or otherwise excessive number of items.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, or any type of media suitable for storing electronic instructions, and each coupled to a computer system bus. Those of skill in the art of integrated circuit design and video codecs appreciate that the invention can be readily fabricated in various types of integrated circuits based on the above functional and structural descriptions, including application specific integrated circuits (ASIC). In addition, the present invention may be incorporated into various types of video coding devices.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

The invention claimed is:

1. A method of providing location information for service vehicles to end users, the method comprising:
    receiving from a plurality of fleet management systems, belonging to a plurality of companies, location information of current locations of a first plurality of service vehicles in a plurality of fleets;
    receiving from a GPS enabled device of an end user a request for a service vehicle comprising GPS location data for a location of the GPS enabled device of the end user;
    determining location information for a second plurality of service vehicles in a vicinity of the location identified by the received GPS location data, the determined location information indicating locations of the second plurality of service vehicles in the vicinity, the second plurality of service vehicles being a subset of the first plurality of service vehicles; and
    transmitting back to the GPS enabled device of the end user, the determined location information for the second plurality of service vehicles in the vicinity of the end user device for display.

2. The method of claim 1, wherein the end user device is a GPS enabled cellular telephone, the GPS location data is based upon longitude and latitude values, and the GPS location data is provided automatically in the request.

3. The method of claim 1, further comprising:
    determining display attributes of the end user device from which the request was received; and
    formatting the location information for the second plurality of service vehicles according to the display attributes of the end user device.

4. The method of claim 1, wherein the request includes a type of service vehicle requested, and determining location information for the second plurality of service vehicles in a vicinity of the received location further comprises determining the location information of the second plurality of service vehicles of the requested type.

5. The method of claim 1, wherein the request includes at least one attribute of a service vehicle to be provided to the end user, and determining location information for the second plurality of service vehicles in a vicinity of the received location further comprises determining the location information of the second plurality of service vehicles having the requested at least one attribute.

6. The method of claim 1, wherein transmitting the location information further comprises transmitting at least one map image onto which the locations of the determined second plurality of service vehicles can be displayed.

7. The method of claim 1, further comprising transmitting secondary information for at least one of the determined second plurality of service vehicles, the secondary information including contact information for contacting a driver of or a company operating at least one of the determined second plurality of service vehicles.

8. The method of claim 1, wherein determining location information for a second plurality of service vehicles in a vicinity of the received location comprises:
    determining a granularity of the location information; and
    determining the second plurality of service vehicles in the vicinity of the location based on the granularity of the location information.

9. The method of claim 1, further comprising:
    transmitting to the end user device contact data for a service company associated with a service vehicle.

10. The method of claim 9, wherein the contact data comprises a URL of a web site of the service company.

11. The method of claim 1, further comprising storing the location information of the current locations of the first plurality of service vehicles in a vehicle position database.

12. A method for obtaining current location information for service vehicles, the method comprising:
    transmitting from a GPS enabled end user device to a vehicle position aggregation system, a request for a service vehicle including GPS location data for a location of the end user device, the vehicle position aggregation system including a vehicle position database comprising real time location information for a first plurality of services vehicles operated by a plurality of service vehicle fleets belonging to a plurality of companies;
    receiving from the vehicle position aggregation system location information for a second plurality of service vehicles in a vicinity of the requested location identified by the transmitted GPS location data, the location information indicating locations of the second plurality of service vehicles in the vicinity, the second plurality of service vehicles being a subset of the first plurality of service vehicles; and
    displaying a map of the vicinity of the requested location and icons representing the second plurality of service vehicles in the vicinity based on the received location information.

13. The method of claim 12, wherein the GPS location data is based upon longitude and latitude values, and the GPS location data is provided automatically in the request.

14. The method of claim 12, wherein transmitting a request includes transmitting display attribute information of the end user device, and wherein the received location information is formatted according to the display attribute information.

15. The method of claim 12, further comprising displaying contact information for directly contacting a service business associated with at least one of the second plurality of service vehicles for which location information was received.

16. The method of claim 12, further comprising in response to a user input, establishing a connection from the end user device to a computer system operated by a service business associated with at least one of the second plurality of service vehicles for which location information was received.

17. The method of claim 12, further comprising in response to a user input, establishing a connection via a telephone network from the end user device to a service business associated with at least one of the second plurality of service vehicles for which location information was received.

18. The method of claim 12, further comprising in response to a user input, establishing a connection via a telephone network from the end user device to a driver of at least one of the second plurality of service vehicles for which location information was received.

19. The method of claim 12, further comprising in response to a user input, transmitting a telephone number of the end user to a service business associated with at least one of the second plurality of service vehicles for which location information was received.

20. The method of claim 12, further comprising in response to a user input, transmitting a telephone number of the end user to a driver of at least one of the second plurality of service vehicles for which location information was received.

21. The method of claim 12, further comprising in response to a user input, transmitting the requested location to a service business associated with at least one of the second plurality of service vehicles for which location information was received.

22. The method of claim 12, further comprising in response to a user input, transmitting the requested location to a driver of at least one of the second plurality of service vehicles for which location information was received.

23. A system for providing location information for service vehicles, the system comprising:
 a data aggregation system interface for receiving from a plurality of fleet management systems, belonging to a plurality of companies, location information of current locations of a first plurality of service vehicles in a plurality of fleets;
 a vehicle position database communicatively coupled to the data aggregation system for receiving and maintaining the location information for the first plurality of service vehicles, each vehicle associated with a vehicle identifier, a fleet identifier, and a current location of the vehicle; and
 a presentation system for receiving, from a GPS enabled end user device, a request for a service vehicle including GPS location data for a location of the GPS enabled end user device, querying the vehicle position database to determine location information for a second plurality of service vehicles in a vicinity of the requested location, the determined location information indicating locations of the second plurality of service vehicles in the vicinity of the requested location, the second plurality of service vehicles being a subset of the first plurality of service vehicles, and for transmitting location information of the second plurality of service vehicles back to the GPS enabled end user device for display.

* * * * *